Patented Sept. 4, 1951

2,566,964

UNITED STATES PATENT OFFICE 2,566,964

FIRE-RETARDANT PAINTS

Herman A. Scholz, Evanston, and Earl E. Saville, Palatine, Ill., assignors to United States Gypsum Company, Chicago, Ill., a corporation of Illinois No Drawing. Application April 24, 1948, Serial No. 23,134

7 Claims. (Cl. 260—39)

The present invention relates to an improvement in fire-retardant paints which are suitable for application to a surface, particularly inherently combustible surfaces such as those of paper, wood, fiber, insulation board, wallboard, etc.

It is well known that ordinary paints are not fire-retardant, and in fact are actually combustible, or in any event will not, to any appreciable degree, retard the combustion of any combustible object to which they have been applied.

It is an object of the present invention to provide a fire-retardant paint which not only is not combustible of itself, but also will insulate combustible materials against flame so as to avoid their ignition.

A further object of the present invention is to provide a coating composition which will form a self-hardening coating composition, which, after drying, will protect the article to which it has been applied against fire.

A further object of the present invention is to provide a fire-retardant coating which tends to intumesce and form frothy, sponge-like, charred masses, incapable of ignition and capable of insulating material against fire.

It is not sufficient in itself that any given paint does by itself neither burn nor support combustion, as a coating may be of a heat-conducting material which will permit the transfer of sufficient heat through a film thereof to raise the temperature of any combustible material beneath it to the point where it will either actually ignite or will give off fumes which themselves are combustible and ignitable.

Therefore, the most effective types of coatings are such as will intumesce when exposed to heat, thereby forming frothy masses which serve as heat insulating barriers.

Our invention relates to a paint which may be first mixed in dry powdered form, the mixture being then mixed with water immediately prior to use, whereafter it may be applied by any suitable means such as by a brush or spray-gun.

The paint is particularly intended for the protection of fiber insulation board or similar inflammable surfaces such, for example, as theater curtains, theater scenery, draperies and the like, which will withstand painting.

The paint is of such a nature that the dry paint film will intumesce almost immediately when subjected to flame temperatures, thereby forming a thick frothy layer which is sufficiently heat-resistant to prevent the transfer of the heat of the flame to the combustible material beneath it.

The exact amount of fire-retardant properties is dependent upon the thickness of the coating applied.

In actual practice we have found that the most effective practical range for the paints to be more fully herein described is by an application in which one pound of the paint calculated on the dry basis is applied to between 9 and 30 square feet of coated surface. Moreover, our paints have successfully passed the so-called "Modified British Test," in which an alcohol flame is applied for seven minutes below a painted board set at an angle of 45 degrees; and have also passed the so-called "Modified Schlyter Test," where a gas flame is allowed to impinge upon two vertical painted panels standing close together with the gas burner between them.

The binders of our improved fire retardant paint are suitable water-soluble aminoplast resins, by which term we mean either a urea formaldehyde resin, a urea-thiourea formaldehyde resin, or a melamine-aldehyde resin.

This term "aminoplast" as used hereinafter and in the subjoined claims, is a well known generic term for resins made from a nitrogen-containing ingredient, and is intended to be used generically for the above mentioned material. The term was first used in the German publication Kolloidzeitschrift, volume 42, page 175 (1927) by O. Manfred and J. Obrist, and is also to be found in Fyleman's Translation of Scheiber & Sandig's "Artificial Resins" published in London, 1931, and also in a book of Plastics by Simonds and Ellis, pages 262–3 and page 956. This term has also been used at least as early as 1928 in the publication "Plastics" (now "Modern Plastics") where it was defined in the 1928 Plastics Directory, Index and Buyer's Guide, page 123, as a group name for plastics derived from amino derivatives such as urea, aniline, etc. It has been used in said publication since that time in this sense. In these publications the term has been Americanized to the term "aminoplastics," but it is believed that the term "aminoplast resins" is most accurately descriptive of the materials in question.

These aminoplast resins are water-soluble and require, after solution in water, the development of a certain amount of acidity to convert them into the insoluble condition. It has been found that hydrogen-ion concentration greater than that corresponding to about pH 5.0 is desirable and a range of from about pH 4.2 to pH 5.0 produces excellent results. This acidification can be secured by any acid-reacting material, but for the purposes of the present invention is best attained by the use of water-soluble acid-reacting ammonium phosphates, such for example as a mixture of mono-ammonium dihydrogen phosphate, and diammonium monohydrogen phosphate.

In order that the paints may produce the proper intumescent effect, they must contain certain pigment-fillers of two different kinds, one selected from one group and another selected from another group; that is to say, one or more of a pigment-filler in each group must be used together with one or more from the other group. Just why these mixed pigment-filler combinations give the results, is not definitely known, but it has been determined that without such admixture from two groups the material will not have the desired intumescence and fire-retardant qualities.

The groups are as follows:

| Group I | Group II |
|---|---|
| Barytes | Silica |
| Gypsum | Clay |
| Lithopone | Pyrophyllite |
| Zinc sulfide | Talc |
| Titanium dioxide | Mica |
| Titanium dioxide—barium sulfate | |
| Titanium dioxide—calcium sulfate | |

It has also been found advantageous to add a small quantity of gum arabic to the composition to give it the desired slip, freedom from curtaining, and also to make it more easily spread by means of a brush, as ordinarily the aqueous solutions of aminoplast resins are rather short and do not brush out well. The addition of the gum arabic overcomes this defect. However, other similar colloidal materials may be used in place of the gum arabic.

Purely as exemplification of the present invention, and without any intention to limit the same in any way, the following formulas or examples are given:

a day or so after they have been mixed. However, dry paint mixtures can be made up by keeping the aminoplast resins and the ammonium phosphates apart. Thus all of the dry ingredients, with the exception of the aminoplast resins, may be mixed into a powdered composition, while the aminoplast resin, also in powdered or at least granular form, may be packed in a separate container or package, with directions to the user to either blend the aminoplast resin with the rest of the ingredients, and then to stir the resulting powder into a suitable quantity of water, or else to dissolve the resin in the water and then stir in the other powdered ingredients.

The aminoplast resins may also be furnished in the form of a solution in either alcohol, alcohol and water, or in water; the solution then being diluted with water and the powdered mixture stirred into the solution.

A preferred manner of effecting this is as follows: The aminoplast resin may be dissolved first in a minimum of water, say about 32 parts of water to 100 parts of the resin, the solution then being diluted with 60 more parts of water. The dry mixture containing all of the other ingredients (354 parts) is then added to the solution of the resin and stirred until a smooth mixture is obtained. This mixture may then be diluted with 65 parts of water and allowed to stand for, say, about thirty minutes. Additional water may then be added to bring the mixture to the desired consistency for spreading upon the surface that is to be coated. A total of from about 225 to about 250 parts of water to 454 parts of the dry mixture of the ingredients including the resin will yield a paint having a good brushing consistency which is capable of producing a coating at the rate of about 18 square feet per pound of the dry powder.

A further caution is necessary, namely that the finished paint has a rather short life due to the insolubilizing effect of the relatively high acidity

| | Examples | | | | | | | | |
|---|---|---|---|---|---|---|---|---|---|
| | I | II | III | IV | V | VI | VII | VIII | IX |
| | Per cent | Per cent | Per cent | Per cent | Per cent | Per cent | Per cent | Per cent | Per cent |
| A zinc sulfide pigment (50%) (such as "Cryptone BA 40") | 21.60 | 21.60 | | | | | | | |
| A lithopone (such as "Albalith #362") | | | | | | | | 23.7 | 23.5 |
| Barytes (Barium Sulfate) | | | 23.10 | | | | | | |
| Zinc sulfide (98%) (such as "Cryptone ZS 180") | | | | 24.25 | | | | | |
| Ground calcium sulfate dihydrate | | | | | 22.50 | | | | |
| A titanium oxide pigment (such as "Ti Pure R 110") | | | | | | 14.80 | | | |
| Silica powdered so as to pass a 325 mesh screen | | | | | | | 22.50 | | |
| Talc | | | 15.00 | | | | | | 15.0 |
| Ground pyrophyllite (such as "Pyrax B") | 5.00 | 5.00 | | 5.45 | 5.62 | 6.40 | 5.62 | 5.5 | |
| Clay | 8.35 | 8.35 | | 9.21 | 9.51 | 10.78 | 9.51 | 9.3 | |
| Mica | 4.20 | 4.20 | 4.50 | 4.46 | 4.60 | 5.23 | 4.60 | 4.5 | 4.5 |
| Monoammonium phosphate | 50.00 | 30.00 | 27.40 | 26.19 | 27.80 | 31.60 | 27.80 | 27.2 | 27.2 |
| Diammonium phosphate | | 20.00 | 5.50 | 5.45 | 5.62 | 6.40 | 5.62 | 5.5 | 5.5 |
| Gum arabic | .65 | .65 | 2.30 | 2.28 | 2.35 | 2.67 | 2.35 | 2.3 | 2.3 |
| A urea formaldehyde resin (such as "Uformite 500") | 10.20 | 10.20 | 22.20 | 22.71 | 22.00 | 22.12 | 22.00 | | |
| A melamine formaldehyde resin (such as "Melmac 421") | | | | | | | | 22.0 | 22.0 |

All of the paints made in accordance with the above nine examples, which for convenience have been given in tabular form so that they may be compared with each other, are described in terms of the dry ingredients which may be formed into a powdered mixture that is then mixed with water to a spreading consistency and then applied in any suitable manner to the article or surface to be painted.

Such powdered mixture should, however, be used promptly, as it has been found that there is a tendency for the gradual insolubilization of the aminoplast resins as the result of the action of the ammonium phosphates. It is therefore advisable to utilize such powdered mixtures within developed in it, and hence no more of the paint should be mixed than can be used up in, say, about four or five hours.

From the above it will be evident that the most convenient form of the paint of the present invention is to furnish it in packages containing two separate parts: one of the mixture of all of the dry ingredients other than the resin, and the other the resin itself.

The behavior of the paint upon application to a given surface, such, for example, as insulation board, is as follows:

As the paint dries, the aminoplast resin therein will become insoluble in water and will hence permanently hold the pigments in place. When a flame is applied to the dried paint film, the gases resulting from the thermal decomposition of the aminoplast resin and the ammonium phosphates will be trapped by the viscous dough-like mass formed by the melting of the ingredients, and which have been stiffened to a heavy consistency by the mixture of fillers, so that there will be formed a thick stiff frothy sponge-like mass which is entirely uncombustible and which will preserve its insulating properties, even though exposed to a naked flame for a period of from 5 to 10 minutes.

The fire-retardant effect thus obtained is usually sufficient to allow persons to make their escape from rooms which are threatened by a conflagration in an adjacent room, as the fire cannot break through even a thin partition until the paint has been destroyed.

It has been found that there are certain pigments which are counter-indicated, and which tend to destroy the value of the present paint formulations; such pigments being, for example, antimony oxide, zinc oxide and ferric oxide.

We are aware of the fact that the use of ammonium phosphates for fireproofing of fabrics and the like is well known. Furthermore, having definitely determined that only a combination of the pigments and fillers from the two groups herein gives satisfactory results, we believe that we have hereby taught the art of producing fire-retardant paint compositions something hitherto quite unknown.

The method of mixing the ingredients is of course extremely simple and they may, if desired, merely be ground together, for example in a ball mill, or if sufficiently powdered, may merely be mixed in a suitably efficient mixing device, with which the art of blending powdered materials is fully conversant.

We claim:

1. A water-soluble fire-retardant coating composition comprising from about 10% to about 30% of a potentially hardenable water-soluble aminoplast resin, from about 30% to about 50% of acid-reacting ammonium phosphates, and sufficient of a mixture of substantial quantities each of at least two pigments to make a total of 100%, one of said pigments being selected from the group consisting of barytes, gypsum, lithopone, zinc sulfide, and titanium oxides, and the other selected from the group consisting of silica, clay, pyrophyllite, talc and mica.

2. The composition as claimed in claim 1 in which the water-soluble aminoplast resin is a urea-formaldehyde condensation product, and the ammonium phosphates are a mixture of mono-ammonium and diammonium phosphates.

3. The composition as claimed in claim 1 in which the aminoplast resin is a melamine-formaldehyde condensation product, and the ammonium phosphates are a mixture of monoammonium and diammonium phosphates.

4. A water-soluble fire-retardant coating composition comprising from about 10% to about 30% of a potentially hardenable water-soluble aminoplast resin, from about 30% to about 50% of acid-reacting ammonium phosphate, and sufficient pigment to bring the total up to 100%, said pigment being a mixture of substantial quantities each of pyrophyllite, clay, mica and zinc sulfide.

5. A water-soluble fire-retardant coating composition comprising from about 10% to about 30% of a potentially hardenable water-soluble aminoplast resin, from about 30% to about 50% of acid-reacting ammonium phosphate, and sufficient pigment to bring the total up to 100%, said pigment being a mixture of substantial quantities each of pyrophyllite, clay, mica and barytes.

6. A water-soluble fire-retardant coating composition comprising from about 10% to about 30% of a potentially hardenable water-soluble aminoplast resin, from about 30% to about 50% of acid-reacting ammonium phosphate, and sufficient pigment to bring the total up to 100%, said pigment being a mixture of substantial quantities each of pyrophyllite, clay, mica and titanium oxide.

7. A water-soluble fire-retardant coating composition comprising from about 10% to about 30% of a potentially hardenable water-soluble melamine-formaldehyde resin, from about 30% to about 50% of acid-reacting ammonium phosphate, and sufficient pigment to bring the total up to 100%, said pigment being a mixture of substantial quantities each of zinc sulfide, pyrophyllite, clay, and mica.

HERMAN A. SCHOLZ.
EARL E. SAVILLE.

REFERENCES CITED

The following references are of record in the file of this patent:

UNITED STATES PATENTS

| Number | Name | Date |
|---|---|---|
| 2,106,938 | Tramm | Feb. 1, 1938 |
| 2,299,612 | Clayton | Oct. 20, 1942 |
| 2,385,500 | Fasold | Sept. 25, 1945 |
| 2,399,489 | Landes | Apr. 30, 1946 |
| 2,437,799 | Yorke | Mar. 16, 1948 |
| 2,452,054 | Jones | Oct. 26, 1948 |

OTHER REFERENCES

Wise Industrial & Engineering Chemistry vol. 36, pp. 144–147, February 1944.